United States Patent [19]

Mizoguchi

[11] Patent Number: 5,501,534
[45] Date of Patent: Mar. 26, 1996

[54] ELECTRONIC APPARATUS WHICH IS AUTOMATICALLY INITIALIZED WHEN NORMAL OPERATION IS RESUMED AFTER THE APPARATUS HAS BEEN IN A LOW POWER CONSUMPTION MODE

[75] Inventor: Shigeru Mizoguchi, Kawasaki, Japan

[73] Assignee: Canon Kabushiki Kaisha, Tokyo, Japan

[21] Appl. No.: 320,425

[22] Filed: Oct. 6, 1994

Related U.S. Application Data

[63] Continuation of Ser. No. 13,178, Jan. 29, 1993, abandoned, which is a continuation of Ser. No. 585,029, Sep. 19, 1990, abandoned, which is a continuation of Ser. No. 290,804, Dec. 23, 1988, abandoned, which is a continuation of Ser. No. 854,438, Apr. 21, 1986, abandoned.

[30] Foreign Application Priority Data

Apr. 26, 1985 [JP] Japan ................... 6-088991

[51] Int. Cl.[6] .................................................. B41J 29/38
[52] U.S. Cl. .................................... 400/54; 364/707
[58] Field of Search ............................. 400/54, 50, 663, 400/668, 669; 364/707

[56] References Cited

U.S. PATENT DOCUMENTS

| 3,354,372 | 11/1967 | Beasley | 400/54 X |
|---|---|---|---|
| 3,753,004 | 8/1973 | Dominic | 400/54 X |
| 3,763,989 | 10/1973 | Goldman | 400/54 X |
| 3,870,138 | 3/1975 | Sato et al. | 400/54 |
| 3,941,989 | 3/1976 | McLaughlin et al. | 364/707 |
| 4,122,513 | 10/1978 | Takahashi et al. | 363/21 |
| 4,143,283 | 3/1979 | Graf et al. | 400/54 X |
| 4,157,588 | 6/1979 | Ebihara et al. | 364/707 |
| 4,189,717 | 2/1980 | Takeuchi | 364/707 X |
| 4,279,523 | 7/1981 | Ringle | 400/54 X |
| 4,317,181 | 2/1982 | Teza et al. | 364/707 |
| 4,365,290 | 12/1982 | Nelms et al. | 364/707 |
| 4,557,615 | 12/1985 | Ueno | 400/54 |

FOREIGN PATENT DOCUMENTS 0188480 10/1984 Japan ............................ 400/54

OTHER PUBLICATIONS

IBM Technical Disclosure Bulletin, "Power Saver for Electronic Typewriter", Gruber et al, vol. 22 No. 9 Feb. 1980, pp. 4123–4124.

IBM Technical Disclosure Bulletin, "Controlled Method of Power Partitioning", Cronch et al, vol. 24 No. 11A Apr. 1982, pp. 5704–5705.

Primary Examiner—David A. Wiecking
Attorney, Agent, or Firm—Fitzpatrick, Cella, Harper & Scinto

[57] ABSTRACT

An electronic apparatus comprises a driver unit and a control unit and has a normal operation mode and a low power consumption mode in which the entire or a portion of the driver unit is in a rest condition. When the mode is changed from the low power consumption mode to the normal operation mode by the control unit, the driver unit is initialized to prevent malfunction which would otherwise be caused when the mode is changed to the normal operation mode.

14 Claims, 2 Drawing Sheets

ELECTRONIC APPARATUS WHICH IS AUTOMATICALLY INITIALIZED WHEN NORMAL OPERATION IS RESUMED AFTER THE APPARATUS HAS BEEN IN A LOW POWER CONSUMPTION MODE

This application is a continuation of application Ser. No. 08/013,178 filed on Jan. 29, 1993, now abandoned which is a continuation of application Ser. No. 07/585,029 filed Sep. 19, 1990, now abandoned, which is a continuation of application Ser. No. 07/290,804 filed Dec. 23, 1988, now abandoned, which is a continuation of application Ser. No. 06/854,438 filed Apr. 21, 1986, now abandoned.

BACKGROUND OF THE INVENTION

1. Field of the Invention

The present invention relates to an electronic apparatus, and more particularly to an electronic apparatus having a driver unit such as a printer and a control unit therefor.

2. Related Background Art

The construction described above is common to various electronic apparatus. In an electronic typewriter apparatus having a driver unit such as a printer unit which consumes relatively high power, when an input or output command is not applied for more than a predetermined period, the printer unit is set in a rest condition or a low power consumption mode. The recovery from the low power consumption mode to a normal operation mode is effected in response to a predetermined operation such as an input from a keyboard.

In the low power consumption mode, control to a detector such as a photo-coupler which detects a position of the printer unit or a member for holding an element such as a solenoid is stopped. Accordingly, if the apparatus in the low power consumption mode is moved or a shock is applied thereto so that the position of the element is changed after the low power consumption mode is assumed, a malfunction may be caused when the mode is returned to the normal operation mode.

SUMMARY OF THE INVENTION

It is an object of the present invention to provide an electronic apparatus capable of switching between a low power consumption mode in which power is supplied only to a control unit and a normal operation mode in which power is supplied to the control unit and a driver unit.

It is another object of the present invention to provide an electronic apparatus in which different power supply units are used depending on whether or not a data input is supplied from input means.

It is another object of the present invention to provide an electronic apparatus which operates in a first operation mode when a data input is supplied from input means and in a second operation mode when the data input is not supplied from the input means for a predetermined time.

DETAILED DESCRIPTION OF PREFERRED EMBODIMENT

In the following description of an embodiment of the present invention, an electronic typewriter is specifically explained.

Figure 1:
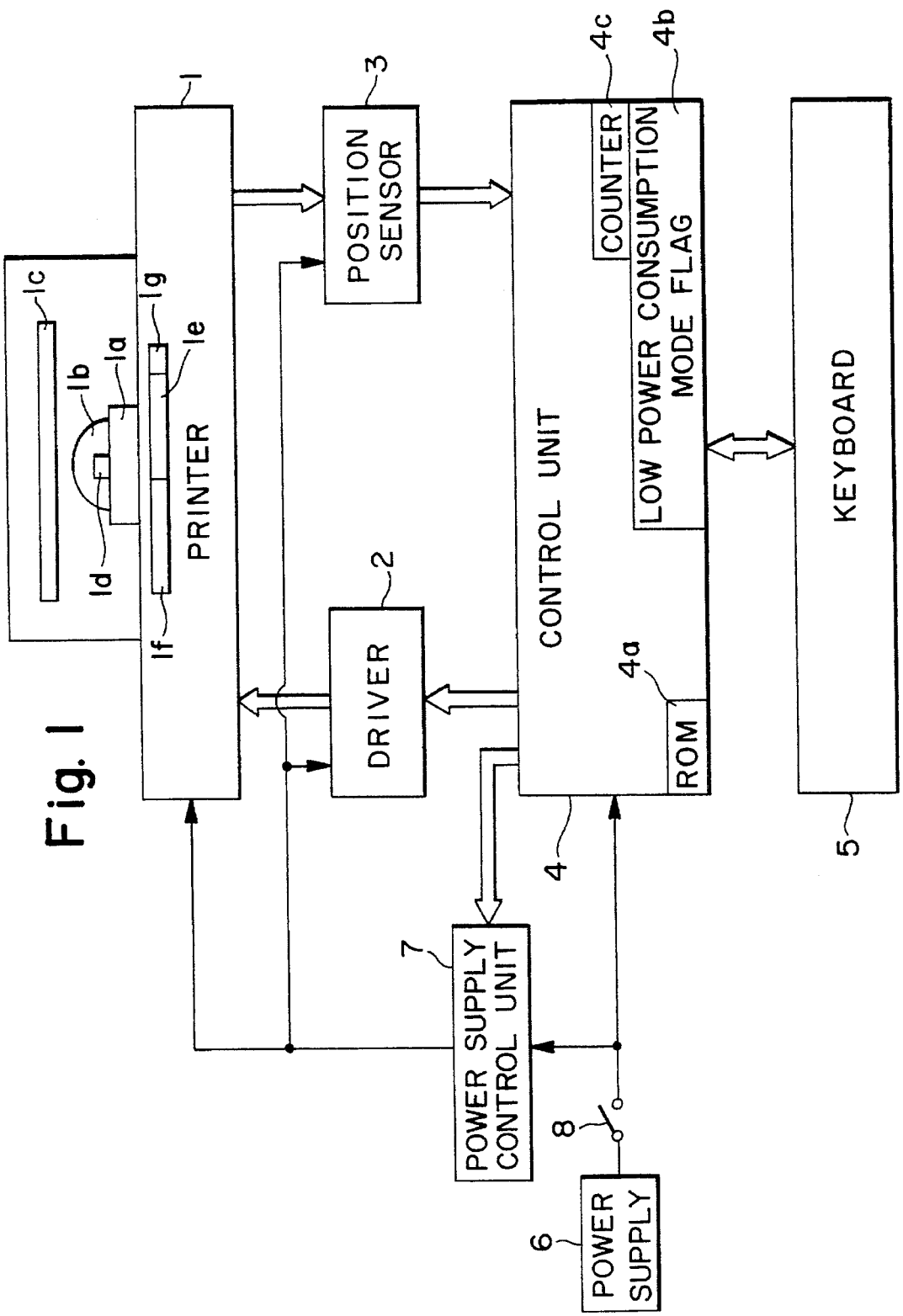
FIG. 1 shows a block diagram of an electronic apparatus of the present invention.
Figure 2:
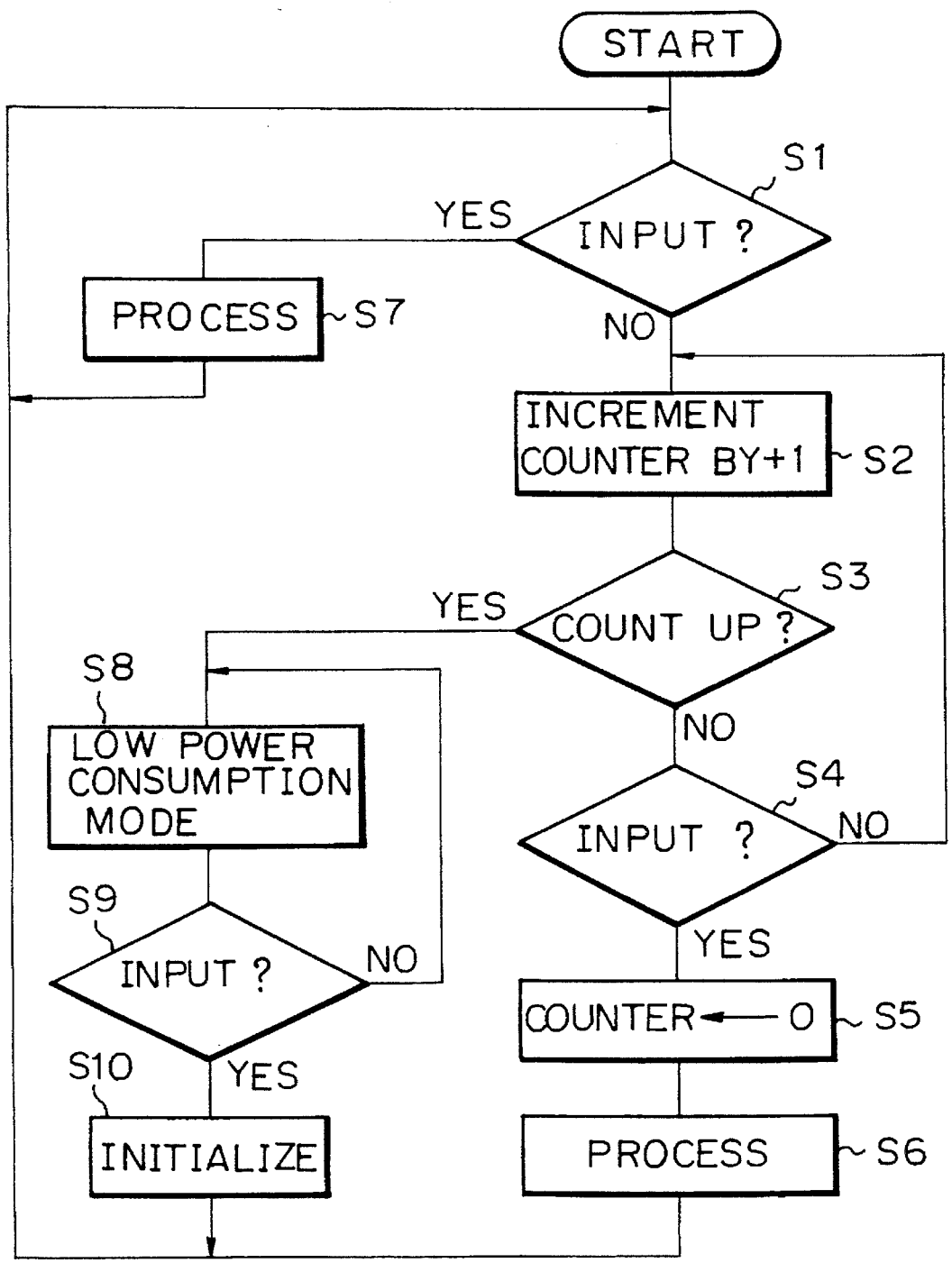
FIG. 2 shows a flow chart for a control procedure of a control unit of FIG. 1.

FIG. 1 shows a block diagram of the electronic typewriter in accordance with the present invention. Numeral 1 denotes a printer unit having a carriage 1a, which carries a daisy wheel 1b, a platen 1c and a print hammer 1d (all schematically shown), which is driven by a control unit 4, such as a microcomputer, through a driver 2. The control unit 4 includes a ROM 4a in which a control program shown in a flow chart of FIG. 2 is stored and a low power consumption mode flag 4b which indicates a low power consumption mode. A position of the carriage 1a of the printer unit 1, a rotation angle of the platen 1c and a type of the daisy wheel 1b selected are detected by a position sensor 3 which comprises a photo-coupler, and a detected signal is fed back to the control unit 4. The control unit 4 refers the output of the position sensor 3 in accordance with an input from a keyboard 5 to drive the printer unit 1 through the driver 2.

The control unit 4 has a normal operation mode in which it controls the printer unit 1 in accordance with a command supplied from the keyboard 5 and a low power consumption mode in which it stops the detection by the position sensor 3 or control of the drive elements such as a position control unit 1e comprising a 1f solenoid and a pulse motor 1g (schematically shown ) of the printer unit 1. In the low power consumption mode, the detection of the positions of the carriage 1a and other elements and the position holding thereof are stopped and the supply of power is stopped to reduce the power consumption. This arrangement is effective particularly in a portable electronic typewriter which is powered by a battery. Numeral 6 denotes a power supply, for example, such as a battery, for supplying power to the electronic equipment, and numeral 7 denotes a power supply control unit which controls supply of the power from the power supply 6 to the driver unit 2, printer unit 1 and a position sensor 3 elements of the electronic apparatus. The control unit 4 and power supply control unit 7 are connected to the power supply 6 by an on-off switch 8.

The switching between the normal operation mode and the low power consumption is effected as shown in FIG. 2 which shows a flow chart for a control procedure of the control unit 4.

When the apparatus is started, the control unit 4 checks in a step S1 if an input from the keyboard 5 has been completed or not. If the input is applied from the keyboard 5, a recording operation is effected in the normal mode in a step S7. The control unit 4 drives the printer unit 1 through the driver 2 to record information, and the operation of the printer unit 1 is monitored by the position sensor 3.

If the input is not detected in the step S1, the process goes to a step S2. In the step S2, a time measurement counter 4c in the control unit 4 is incremented by one and the process goes to a step S3. In the step S3, whether the counter 4c has been incremented to a count corresponding to a predetermined waiting time or not is checked. If yes, the process goes to a step S8, and if not, the process goes to a step S4.

In the step S4, whether or not an input from the keyboard 5 has been received is checked again. If the input has not been received, the process returns to the step S2 where the counter 4c is incremented. If the input has been received, the process goes to a step S5 where the counter 4c is reset. In a step S6, information is recorded in the same manner as the step S7 and the process returns to the step S1.

In a step S8, reached if the counter 4c is incremented to the predetermined count, low power consumption mode flag 4b is set in response to which the power supply control unit 7 interrupts supply of power from the power supply 6 to the printer unit 1, driver 2, and position sensor 3 as shown in FIG. 1. Therefore, the detection operation of the position sensor 3 and the operation of the position control unit 1e which comprises the pulse motor 1g and solenoid 1f are stopped and a supply of power to the driver 2 is stopped to enter into the low power consumption mode. In a step S9, whether an input from the keyboard 5 has been applied or not is checked again. If the input has not been applied, the step S8 is repeated to maintain the low power consumption mode.

If an input is subsequently received from the keyboard 5, the process goes to a step S10 where initialization operation is carried out to move the carriage 1a of the printer unit 1 to the home position and return the daisy wheel 1b to the initial position. This control is done through the driver 2. After the initialization, the process returns to the step S1 and the above operation is repeated.

With the present arrangement, when the mode is changed from the low power consumption mode to the normal operation mode, the initialization is carried out in the step S10 to return the carriage 1a and the daisy wheel 1b to their home positions. Accordingly, even if the carriage 1a or the daisy wheel 1b is moved in the low power consumption mode to a different position than that it took before the low power consumption mode was assumed, an intended record operation is always attained. Thus, no malfunction occurs when the normal mode is resumed from the low power consumption mode.

While the electronic typewriter has been described in the above embodiment, the present invention is applicable to any other electronic apparatus having the low power consumption mode such as a desk-top calculator with a printer or a word processor.

As described above, according to the present invention, in the electronic apparatus which comprises the driver unit 2 and the control unit 4 and which has the normal operation mode and the low power consumption mode in which an entire or a portion of the driver unit 2 is in a rest condition, the driver unit 2 is initialized by the control unit 4 when the mode is changed from the low power consumption mode to the normal operation mode. Thus, even if the position of the elements of the driver unit 2 have been changed in the low power consumption mode, a malfunction does not occur when the mode is returned to the normal mode and the intended operation can be performed immediately after the return to the normal operation mode.

What is claimed is:

1. An electronic apparatus comprising:
   input means including a keyboard having a plurality of character keys for entering respective characters;
   processing means for processing a character entered by said input means;
   a printer for outputting the character processed by said processing means;
   mode selection means for selecting, in response to entry of a character by said input means, one of a low power consumption mode in which said printer achieves low power consumption and a normal operation mode in which said printer achieves normal power consumption;
   power control means for selectively supplying said printer with power in response to the selection of a mode by said selection means; and
   control means for, in response to operation of a character key in the low power consumption mode, changing the low power consumption mode to the normal operation mode without printing a character corresponding to the operated character key.

2. An electronic apparatus according to claim 1, wherein said control means includes means for initializing said printer.

3. An electronic apparatus according to claim 1, wherein said control means comprises detection means for detecting the operation of a character key.

4. An electronic apparatus according to claim 3, further comprising means for retaining the low power consumption mode when the operation of a character key is not detected by said detection means.

5. An electronic apparatus according to claim 1, wherein said mode selection means comprises counter means for counting elapsed time.

6. An electronic apparatus according to claim 5, further comprising means for selecting the low power consumption mode in accordance with a count value of said counter means.

7. An electronic apparatus comprising:
   input means having a plurality of character keys for entering respective characters;
   processing means for processing a character entered by said input means;
   a print unit having a carriage for outputting the character processed by said processing means;
   mode setting means for setting said print unit in an idle state from a normal state when a character has not been input by said input means for a predetermined time period; and
   control means, in response to operation of a character key, for printing a character corresponding to the operated character key when said print unit is in the normal state, and for changing the idle state to the normal state without printing the character corresponding to the operated character key when said print unit is in the idle state.

8. An electronic apparatus according to claim 7, wherein said mode setting means comprises timer means to count elapsed time.

9. An electronic apparatus according to claim 7, wherein said control means includes means for initializing said print unit.

10. An electronic apparatus according to claim 7, wherein said mode setting means comprises timer means and means for initializing said timer means in response to operation of one of said character keys within a predetermined time.

11. An electronic apparatus according to claim 8, further comprising determining means for changing from the normal state to the idle state when said timer means achieves a predetermined count value.

12. An electronic apparatus comprising:
   input means including a keyboard having a plurality of character keys for entering respective characters;
   output means for visually displaying a character entered from said input means;

detection means for detecting the operation of a character key of said input means;

switch means for changing said electronic apparatus from a normal state to an idle state when said detection means does not detect operation of a character key within a predetermined period of time; and control means for causing initialization of said output means and for changing the idle state to the normal state in response to operation of one of said character keys when said electronic apparatus has been switched to an idle state by said switch means, without printing the character corresponding to the operated character key.

13. An electronic apparatus according to claim 12, wherein said output means is a print unit.

14. An electronic apparatus according to claim 12, wherein said control means initializes said output means.

* * * * *